United States Patent [19]

Adickes

[11] 4,372,577
[45] Feb. 8, 1983

[54] TRACTOR

[75] Inventor: Henning Adickes, Heidelberg, Fed. Rep. of Germany

[73] Assignee: Deere & Company, Moline, Ill.

[21] Appl. No.: 164,800

[22] Filed: Jun. 30, 1980

[30] Foreign Application Priority Data

Jul. 27, 1979 [GB] United Kingdom ............... 7926193

[51] Int. Cl.³ .......................... B62D 1/16; B62D 1/18
[52] U.S. Cl. .................................................. 280/780
[58] Field of Search .............................. 280/779, 780

[56] References Cited

U.S. PATENT DOCUMENTS

| 1,483,903 | 2/1924 | Masury | 280/780 |
| 1,572,519 | 2/1926 | Davis | 280/780 X |
| 1,803,013 | 4/1931 | Grimm | 280/78 UX |
| 1,820,220 | 8/1931 | Geyer | 280/780 |
| 2,336,511 | 12/1943 | Stolte | 280/780 |
| 2,873,979 | 2/1959 | Venditty et al. | 280/780 X |
| 3,300,229 | 1/1967 | Kishline | 180/87 |
| 4,101,147 | 7/1978 | Ederati et al. | 280/779 X |

FOREIGN PATENT DOCUMENTS

| 1247156 | 8/1967 | Fed. Rep. of Germany . |
| 2027441 | 6/1977 | Fed. Rep. of Germany . |
| 322473 | 12/1929 | United Kingdom . |
| 532566 | 1/1941 | United Kingdom . |
| 935773 | 9/1963 | United Kingdom . |
| 1370876 | 10/1974 | United Kingdom . |
| 1542001 | 3/1979 | United Kingdom . |

Primary Examiner—Joseph Paul Brust

[57] ABSTRACT

A tractor has a hydrostatic steering assembly 16 including a steering column 22 connected to a steering valve 18 mounted on a housing 10 for a dash.

To dampen vibrations of the steering column 22, and to prevent any excessive movement of it when a high load is applied, a support assembly 26 is provided. This comprises a support column 28 with a bracket 30, at its upper end, which has an aperture 42 through which the steering column 22 passes. On the underside of the bracket 30, there is a polyurethane vibration dampening insert 32 which has an aperture 46 through which the steering column 22 also passes. The latter aperture 46 fits around the steering column 22 closely while the bracket aperture 42 is larger.

Due to the difference in the sizes of the apertures 46, 42, slight deflections of the steering column 22 will be opposed only by the insert 32, but if a high load produces a large enough deflection, the insert 32 will be so compressed that the steering column 22 will come into abutment with the bracket 30 to limit its movement.

2 Claims, 3 Drawing Figures

TRACTOR

BACKGROUND OF THE INVENTION

This invention relates to a tractor, and particularly to a tractor having hydrostatic steering.

A hydrostatic steering assembly for a tractor includes a steering column connected to a steering valve at the rear of a dash of the tractor. If the steering valve is mounted on a housing for the dash, there is a tendency for the steering wheel to suffer vibration and to be rather prone to excessive deflection if a load is put upon it during service, e.g. if a driver pulls himself up into his position on the tractor by grasping the steering wheel.

SUMMARY OF THE INVENTION

According to the present invention, a tractor has a steering assembly including a steering column, a support column, a bracket on the support column through which the steering column passes, and a vibration dampening member disposed between the steering column and the bracket so as to dampen vibration in the steering column.

Preferably, the vibration dampening member is disposed so that under high deflecting load, the steering column can contact the bracket.

Desirably, the vibration dampening member is arranged so that the steering column passes through it and through the bracket sequentially, the aperture for the steering column in the dampening member being smaller than that in the bracket so that under the said high load, the dampening member is compressed sufficiently for the steering column to contact the bracket at the periphery of its aperture.

BRIEF DESCRIPTION OF THE DRAWINGS

An embodiment of the invention will now be described with reference to the accompanying diagrammatic drawings in which.

DETAILED DESCRIPTION

Figure 1:
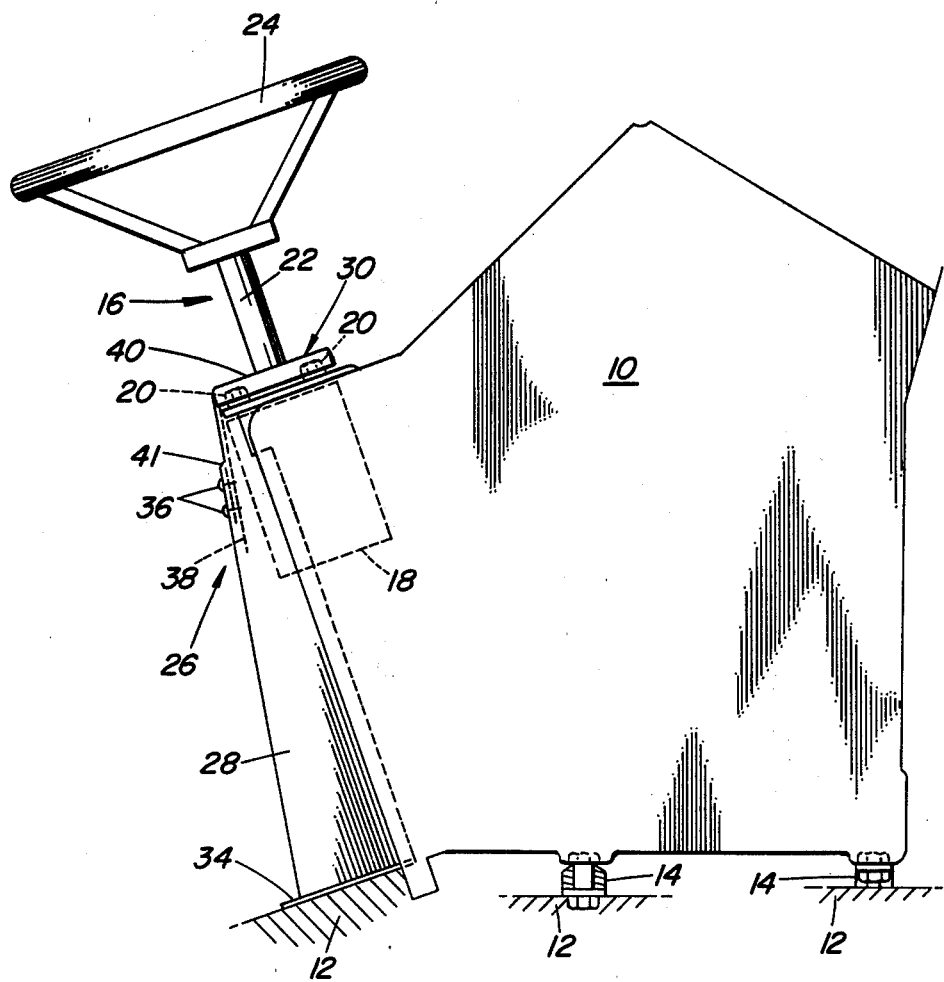
FIG. 1 is a side view of a dash housing and a hydrostatic steering assembly of a tractor.

Referring initially to FIG. 1, a dash housing 10 is bolted to a clutch housing 12 through vibration isolating spring metal angle members 14. The housing 10 extends on either side of the dash, on its rearward side and over its top. Reference to "rear" and "front" herein are, as usual, in relation to the point of view of a driver.

The housing 10 is of strong construction of sheet and framework and supports, at its rearward top portion, a steering assembly 16 and, in particular, a steering valve 18 which is bolted by four bolts 20, of which two only are shown, to the underside thereof. The steering valve 18 is connected in conventional manner to a steering column 22 associated with a steering wheel 24.

In such an arrangement, in spite of the heavy construction of the dash housing 10 on which the steering assembly 16 is mounted, the steering wheel 24 is prone to undue movement when highly loaded, e.g. by the driver grasping the steering wheel 24 to pull himself up from the ground to his seat or during driving over rough terrain and to some vibration movement.

In order to dampen vibration of the steering wheel 24 and to prevent unduly large movement, a support assembly 26 is provided. This assembly 26 consists of a support column 28, a bracket 30, and a vibration isolating polyurethane insert 32.

In more detail, the arrangement of the support assembly 26 is as follows. The support column 28 has a base flange 34 which is bolted to the clutch housing 12 of the tractor to position the support column 28 centrally and mainly rearwardly of the dash housing 10 although the support column 28 extends at its front side somewhat into the dash housing for reasons of styling. From the base flange 34 the support column 28 extends upwardly and rearwardly so that it is at an angle of approximately 19 degrees to the vertical.

The bracket 30 is "L"-shaped and rigidly mounted by bolts 36 through an upright first leg 38 of the "L" at the top end of the support column 28 so that the remaining second leg 40 of the bracket 30 extends forwardly from the support column 28 at right angles to the shaft 22. The bolts 36 pass through upright slots (not shown) in a mounting plate 41 for the first leg 38 so limited adjustment of the bracket 30 is possible for it to be correctly aligned in relation to the steering column 22. The second leg 40 has an aperture 42 which is rather larger than the steering column 22 and through which the steering column passes, the second leg 40 being disposed to overlie the top of the dash housing 10 above the steering valve 18.

Figure 2:
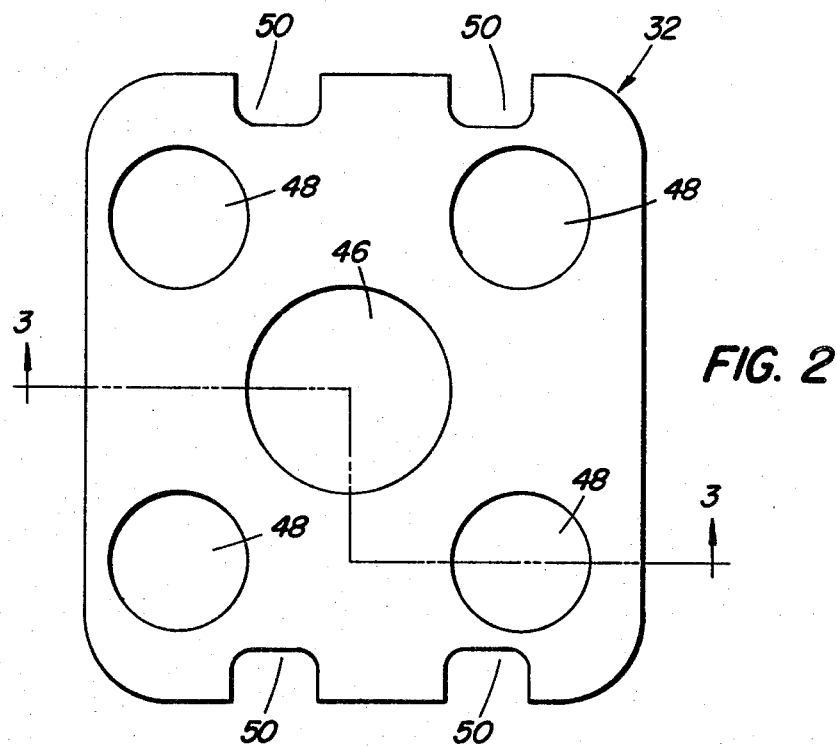
FIG. 2 is a view, from above, of a vibration dampening insert of the steering assembly of FIG. 1.
Figure 3:
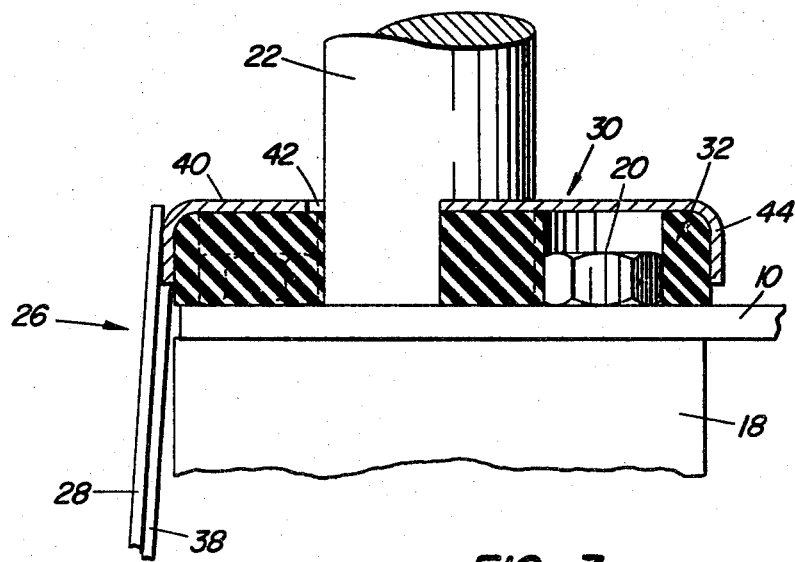
FIG. 3 is a view taken along the line III—III of FIG. 2, including other parts of the assembly in the region of the insert.

The second leg 40 has a downwardly directed flange or lip 44 at its periphery defining an upturned bowl or a downwardly opening trough in which the polyurethane insert 32 is received, as can be seen in FIG. 3. The insert 32 has a central aperture 46 (FIG. 2) which fits closely around the steering column 22 and which is of smaller diameter than the aperture 42. The insert is thus sandwiched between the second leg 40 and the dash housing 10 and, as seen in FIG. 3, has a thickness which is greater than the length of the lip 44. The bolts 20 protrude, of course, from the housing 10 and these are accommodated in corresponding apertures 48 in the insert 32. The insert 32 is force-fit in the second leg trough and has bites 50 in its periphery to assist compression for mounting.

During service, vibration of the steering column 22 and movement of it due to light loads are resisted by the insert 32. However, if an excessive load is applied to the steering wheel 24 and hence the steering column 22, the column 22 will compress the insert 32 until the column 22 comes into abutment with the second leg 40 at the periphery of the aperture 42, after which further movement of the column is prevented.

I claim:

1. A tractor steering assembly comprising:
    a support housing;
    a steering valve fixed to the support housing;
    a generally L-shaped bracket having a first downwardly extending leg and a second leg having a downwardly extending lip circumscribing a downwardly opening trough and having a bracket aperture extending therethrough;
    adjustable means for attaching the first leg to the support housing and for permitting alignment of the bracket;
    a damping member positioned between the second leg and the support housing and received by the trough, the damping member having a thickness which is greater than the length of the lip of the second bracket leg and having a damping bore with a diameter which is smaller than the diameter of the bracket aperture; and a steering column coupled to the steering valve and extending through the bore in the damping member and through the bracket aperture, the damping member resiliently resisting relative movement between the bracket and the steering column and yielding to permit engagement between the steering column and a peripheral surface of the bracket aperture upon predetermined compression of the damping member, the damping member damping vibrations of the steering column under low loads, and the peripheral surface of the bracket aperture engaging the steering column to limit deflection of the steering column under high loads.

2. The steering assembly of claim 1, wherein:

the steering valve is connected to the support housing via mounting bolts; and the damping member includes a plurality of apertures for receiving the steering valve mounting bolts.

* * * * *